United States Patent
Chassiboud

(10) Patent No.: US 6,698,343 B2
(45) Date of Patent: Mar. 2, 2004

(54) BALING CHAMBER HAVING ADJUSTABLE CROSS SECTION

(75) Inventor: Jean-Loup Chassiboud, Esmoulins (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/214,958

(22) Filed: Aug. 8, 2002

(65) Prior Publication Data
US 2003/0029330 A1 Feb. 13, 2003

(30) Foreign Application Priority Data
Aug. 10, 2001 (DE) ......................... 101 45 690

(51) Int. Cl.$^7$ ................................. B30B 9/30
(52) U.S. Cl. ..................... 100/191; 100/8; 56/432
(58) Field of Search .................. 100/8, 13, 177, 100/178, 183, 188 R, 189, 218, 219, 226, 242, 246, 190–198; 56/341, 343, 432, 433, 440, 442, 443, 446, 434

(56) References Cited

U.S. PATENT DOCUMENTS

| | | | | |
|---|---|---|---|---|
| 4,037,528 A | * | 7/1977 | White et al. ................. | 100/191 |
| 4,489,648 A | * | 12/1984 | Naaktgeboren ............... | 100/191 |
| 4,750,418 A | * | 6/1988 | Naaktgeboren ............... | 100/50 |
| 5,950,410 A | | 9/1999 | O'Brien et al. ............... | 56/341 |
| 6,026,741 A | * | 2/2000 | Lippens et al. ............... | 100/41 |
| 6,134,870 A | * | 10/2000 | Lippens et al. ............... | 56/432 |

FOREIGN PATENT DOCUMENTS

| | | |
|---|---|---|
| DE | 43 41 609 | 6/1995 |
| DE | 298 11 991 U1 | 9/1999 |
| EP | 01 52 970 | 8/1985 |

* cited by examiner

*Primary Examiner*—Allen Ostrager
*Assistant Examiner*—Shelby Self

(57) ABSTRACT

A baler for the production of parallelepiped or slab-shaped bales is provided with a baling chamber whose cross section can be easily repositioned in height by servo motors that operate to adjust one part of the baling chamber relative to an overlapping second part. Corresponding adjustments can be made to the position of a driver for the baling piston, which itself is constructed to include separate telescoping parts. In addition, the needle assembly is provided with needle carrying arms that are mounted for movement with the movable part of the baling chamber.

11 Claims, 3 Drawing Sheets

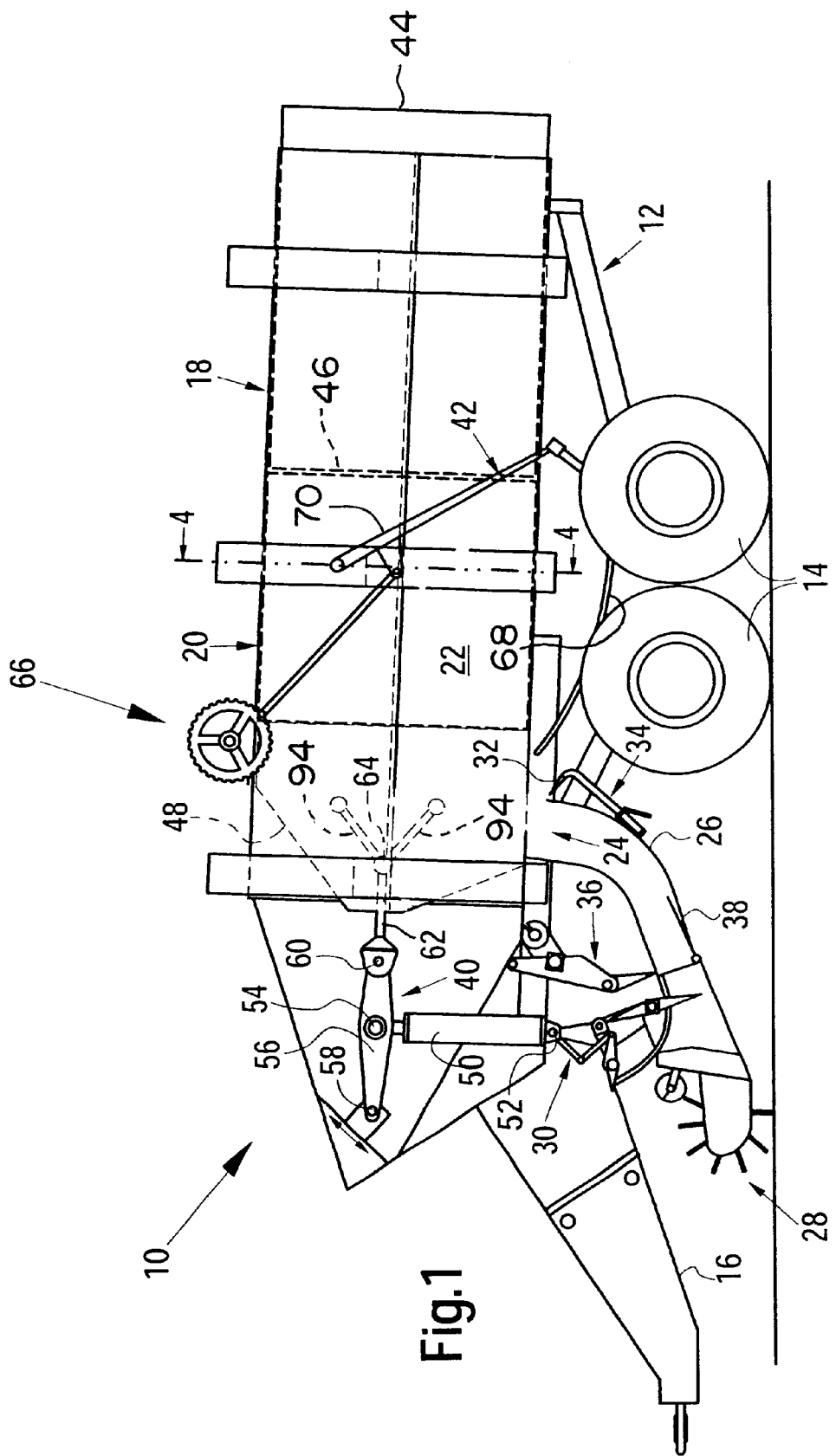

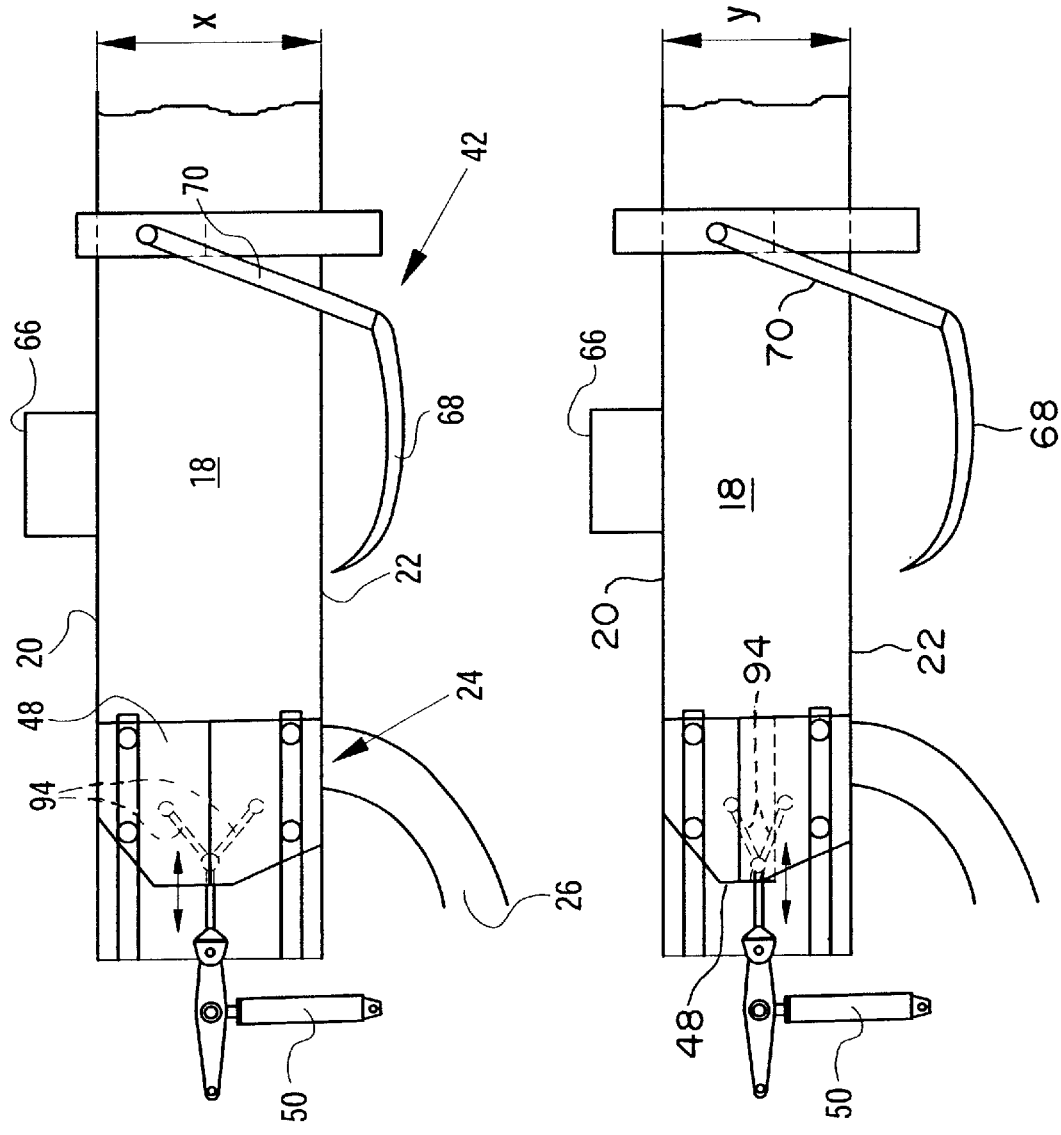

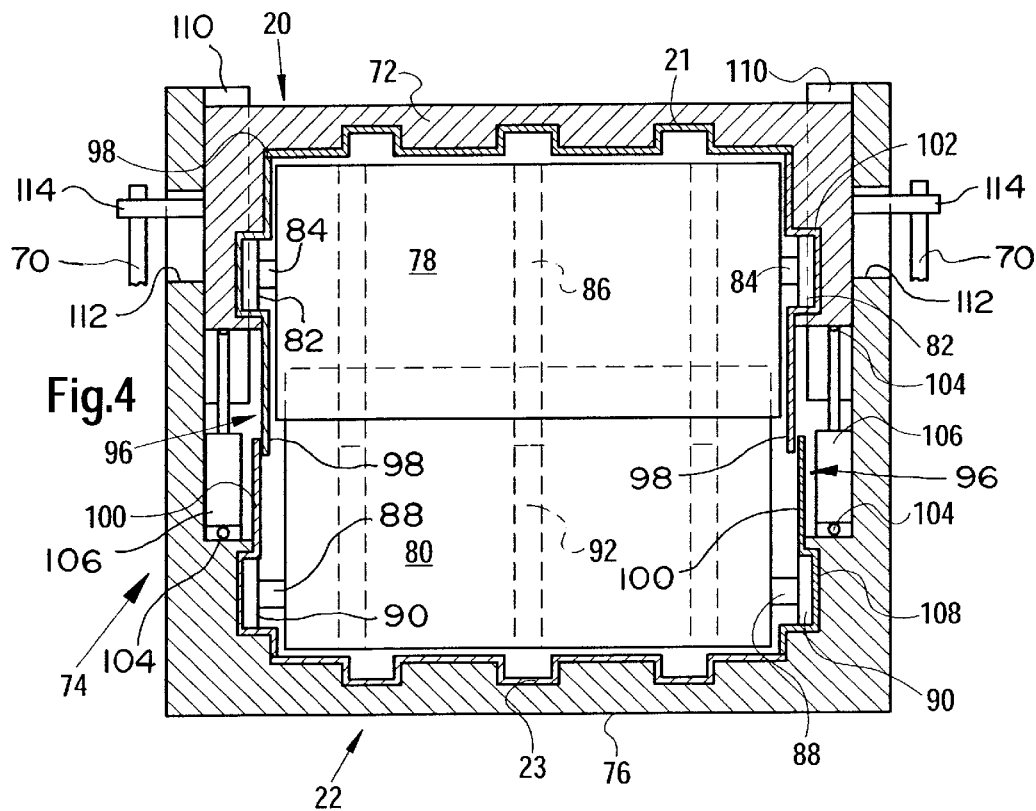
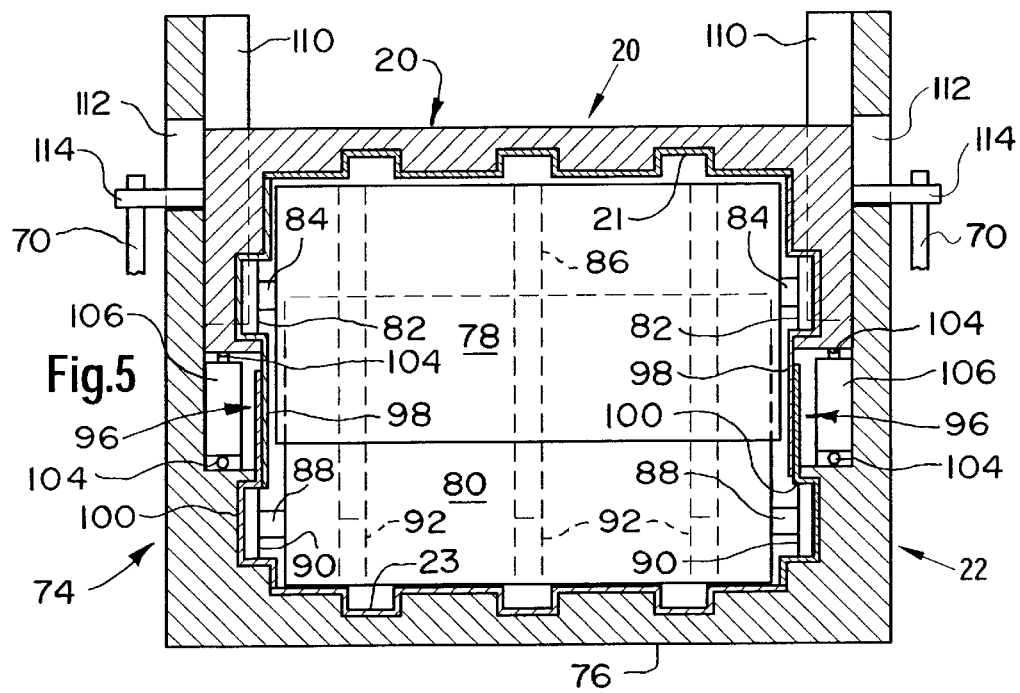

BALING CHAMBER HAVING ADJUSTABLE CROSS SECTION

FIELD OF THE INVENTION

The invention concerns a baler with a slab-shaped baling chamber and a baling piston that can move within it.

BACKGROUND OF THE INVENTION

The prospectus "GREENLAND Large Baler Vario Industry", no publication date, discloses a large baler with a baling chamber that can be disassembled and re-assembled in 5 cm. steps between a height of 0.65 m. and 0.8 m. In this way, bales of differing dimensions can be produced.

The problem underlying the invention is seen in the fact that a rebuilding to another chamber cross section requires approximately one working day. Furthermore at the present a greater range of chamber cross sections is being demanded.

SUMMARY OF THE INVENTION

According to the present invention, there is provided a novel, adjustable baling chamber construction for a baler that forms parallelepiped bales.

An object of the invention is to provide a baling chamber for a baler for making parallelepiped bales, constructed such that its cross section can be easily changed as desired, for example, made to conform to the size, particularly the height, of the transport vehicle available for the particular field.

A more specific object of the invention is to make an adjustable baling chamber, as defined in the previous object, constructed such that the needles and with these the entire binding arrangement is located on a movable upper part of the chamber housing so that the spacial relationship does not change during its repositioning, whereby a safe entry of the points of the needles into the knot tying device is assured.

Another object of the invention is to provide an adjustable baling chamber, as set forth in the previous objects, and in addition to provide the ability to reposition a drive, for example, a flywheel gearbox with a crank arm or a hydraulic motor in the direction of repositioning of the upper housing part of the chamber so as to make it possible to apply the force at all times to the center of the baling piston, so that this component occupies a safe end position without any tilting or binding.

Another specific object of the invention is to provide a multi-part configuration of the baling piston in addition to the adjustable baling chamber so as to make it possible to let the piston "grow along" to correspond with the repositioning of the upper part of the chamber housing, so that a baling pressure is always applied to the entire end face of the bale.

Yet another specific object of the invention is to provide a baling chamber constructed so as to have an upper housing part that is adjustable through the use of threaded spindles, spread linkages or, more advantageously, through the use of motors, particularly of remote controlled motors, since these can transmit great forces by simple means.

A suitable construction for achieving the adjustability of the baling chamber results if the side surfaces of the baling chamber are covered across their entire height; then no part of the crop to be baled can escape and cause jams. Further advantages are achieved if the side surfaces are continuous one-piece components extending from the top or from the bottom, since the result is a smooth surface with low frictional resistance; and if upper and lower walls are provided, that overlap in the vertical direction, there is the advantage that the entire side wall project neither at the top nor at the bottom. Depending on the dimensions selected, a sufficiently large vertical repositioning movement can be attained, making access to the baling chamber from the outside possible.

If the baling housing as well as the baling piston are divided horizontally and overlap, particularly in the vertical direction, so as to telescope, and a positive locking connection between each of the upper and lower components is created, for example, by means of guides, rolls and rails, then a repositioning of the upper part of the housing of the baling housing results simultaneously in a repositioning of the baling piston.

A light-weight configuration of the baler is attained by having the large components, in particular the cover or top and the bottom, as well as the side walls of the baling chamber, be configured as light-weight designs; then the forces are absorbed by but a few massive components, particularly the repositioning arrangement, which surround, carry and reposition these.

A connection of the upper part and the lower part of the baling piston in the direction in which the baling piston applies its force to the crop to be baled, has the advantage that the two parts do not shift relative to each other or transmit differing forces to the drive.

A relatively uniform transmission of the forces of the drive to the baling piston is attained by the use of two steering or guide arms that start from a common connection to the drive, for example, to the free end of a crank arm, and extend in a spread arrangement to each of the components of the baling piston.

The compliance of the position of the needles to the knot tying devices can be accomplished easily, if openings are provided in the base body through which journals can extend that carry the needle support arms and are connected with the movable part of the repositioning arrangement.

If in place of a change in the height of the bale its width is to be changed, then not only the height of the platform of the transport vehicle, but alternatively also the length and width can be considered and an optimum loading can be attained. In principle the repositioning arrangement would only be rotated through 90° and extended in the horizontal direction. The baling piston would not be changed in its height but in its width instead. If the supply channel is made to conform in its cross section or has been provided with guide vanes, a uniform charge across the entire width is assured.

BRIEF DESCRIPTION OF THE DRAWINGS

FIG. 1 is a schematic left side elevational view of a baler having an adjustable baling chamber constructed according to the invention.

FIG. 2 is a schematic left side elevational view of the baling chamber of the baler in a maximum height condition.

FIG. 3 is a view like that of FIG. 2 but showing the baling chamber of the baler in a minimum height condition.

FIG. 4 is a vertical sectional view taken along line 4—4 of FIG. 1 and showing the baling chamber in its maximum height condition.

FIG. 5 is a vertical section view like that of FIG. 4 but showing the baling chamber in its minimum height condition.

DESCRIPTION OF THE PREFERRED EMBODIMENT

FIG. 1 shows a baler 10 in the form of a large baler for the production of parallelepiped or slab-shaped bales. The baler 10 includes a frame 12 that is supported on the ground on support wheels 14 in a tandem arrangement. A towbar or tongue 16 is connected to, and projects forwardly from, the frame 12 and is configured in such a way that it can be connected to a towing vehicle, such as an agricultural tractor, not shown, which is equipped with a power take-off shaft that delivers power for the drives of various driven components of the baler 10. A baling chamber 18 or an enclosure of rectangular cross section is formed partially by an upper housing part 20 and a lower housing part 22, where the lower housing part 22 is provided with a crop inlet 24, to which a curved supply chute or channel 26 is connected, that is used as a pre-compression chamber, as will be described below. A take-up arrangement 28 in the form of a pick-up together with a center-feed screw conveyor is arranged ahead of the supply channel 26, in order to take up a swath or windrow of harvested crop from the ground and to deliver it to a compression fork 30, that is used to compress harvested crop in the supply channel 26 until a load of pre-determined density has accumulated downstream of fingers 32 of a retaining arrangement 34. The retaining arrangement 34 is arranged to pivot between a retaining position, in which the fingers 32 project into the supply channel 26 in the vicinity of the crop inlet 24, and a supply position, in which the fingers 32 are retracted out of the supply channel 26, as illustrated, in order to make it possible for a load or charge of harvested crop to be inserted through the crop inlet 24 into the baling chamber 18 by means of loading fork assembly 36. At a forward lower location of the supply channel 26, a spring loaded flap 38 is mounted, free to pivot, that pivots as a function of the crop loaded into the supply channel 26 and acts in response to the crop reaching a desired density to effect a complete circuit for supplying current to an electrical control circuit (not shown) which establishes corresponding drive connections, that initially have the effect that the retaining arrangement 34 moves in such a way that the fingers 32 are retracted out of the blocking position into the position shown in FIG. 1, and then activates the loading fork assembly 36 in such a way that thereupon the compression fork 30 can slide through the supply channel 26 and can move the load or charge of the harvested crop into the baling chamber 18. Once the load of the harvested crop has been forced into the baling chamber 18, a piston mechanism 40, that is arranged at the front of the frame 12, is actuated in a controlled sequence, after the loading fork assembly 36, in order to move the harvested crop to the rear into the baling chamber 18, where it is compressed in stack, as is well known in the state of the art. After the stack of compressed material has reached a pre-determined length, a needle assembly 42 including several curved needles 68 is actuated in order to deliver binding twine and to conduct several strands of twine to a corresponding number of knot tying devices, not shown, that operate in such a way that they lay lengths of twine around the pre-determined length of the stack, in order to form a bale 44 that is ready for unloading, which occurs when it is forced out of the rear end region of the baling chamber 18 by a part of a bale 46 which increases in length, when new loads of harvested crop are forced into the baling chamber 18. Since the invention—as explained below—concerns the repositioning of the baling chamber 18, the amount of the harvested crop supplied could be made to conform to the particular size of the baling chamber 18.

Referring again to the piston mechanism 40, it can be seen that the latter includes a baling piston 48 that is arranged for a back-and-forth movement in the baling chamber 18 between a retracted position ahead of the crop inlet 24 and an extended position beyond the crop inlet 24, as shown in FIG. 1. This movement of the baling piston 48 has the result that loads of crop that are introduced from the supply channel 26 into the baling chamber 18 are compressed against a stack of crop which includes the partially completed bale 46 and/or the complete bale 44. Furthermore, the piston mechanism 40 includes a driver 50 configured as an actuating arrangement, that can be extended and retracted, which is pictured here as a double-acting hydraulic cylinder-piston unit, whose cylinder end is anchored with a pin 52, free to pivot, on the frame 12 at a location above the compression fork 30. The piston end of the driver 50 is connected at a connecting point 54, with a device such as a pin, at a location between opposite ends of a steering arm 56 used as a crank arm, whose forward end region is connected, free to pivot, at a bearing location 58 on the frame 12. A rear end region of the first steering arm 56 is connected at a bearing location 60 with a device such as a pin to a forward end region of a second steering arm 62 operating as connecting rod, whose rear end region is connected at a bearing location 64, by means of a device such as a pin, to a steering arm arrangement including upper and lower steering arms 94, each having its rear end pivotally connected to the baling piston 48. It should be noted here that the connecting pins of the bearing locations 58 and 64 are arranged along a line of centers that lies along or approximately along a central longitudinal centerline of the baling chamber 18. This has the result that the reaction force of the crop, which acts upon the baling piston 48, is essentially absorbed by the driver 50 when the first and the second steering arms 56 and 62 are located along a line, which is the case, when the baling piston 48 is located in its rear end position. Furthermore, it should be noted that the two steering arms 56 and 62 could be configured as a pair of steering arms spaced at a distance to each other in the transverse direction. The driver 50 would then be connected at the connecting points 54 (pin) at a point between the pair of steering arms 56 which form the first steering arm 56. It should therefore be recognized that the baling piston 48 forms the slider of a slider crank mechanism that contains a first steering arm 56, functioning as a crank arm, and a second steering arm 62 together with the steering arms 94, functioning as a connecting rod. Although the linkage formed by the steering arms 56, 62 and 94 does not move beyond a dead center position, it could be characterized as a toggle joint mechanism or a toggle joint. Although the preferred embodiment shows a driver 50, that is connected to the first steering arm 56 at a location between opposite ends of the first steering arm 56, the driver furthermore could be connected at any location between the bearing location 58 and the bearing location 64, for example, the driver 50 could be connected at the pin 60 or at a point along the length of the second steering arm 62, where the operation can be performed even better than with the known arrangement, in which the actuating arrangement is connected directly to the baling piston 48.

Further details of this baler 10 are described in EP-A2-0 940 072 whose disclosure is incorporated herein. It should be noted that in place of this special drive with a hydraulic motor, a conventional crank drive could be applied equally well.

FIGS. 2 through 5 concern only the configuration of the baling chamber 18 and the baling piston 48 carried in it. The unique property of this invention lies in the fact that the cross section, particularly the height of the baling chamber 18 can be changed, in order to be able to produce bales 44 of differing heights and thereby also differing mass.

For this purpose the upper part of the housing 20 is arranged so that it can be repositioned in height, as will be described below on the basis of FIG. 4.

The upper part of the housing 20 is equipped with a cover or top 21, that is configured in conventional manner as a heavy profiled sheet metal component, that is relatively stiff in bending in itself and preferably extends as a one-piece component over the entire length of the baling chamber 18. On the upper side of the upper housing part 20 and to the rear of the supply channel 26, a knot tying device assembly 66 is provided in a known manner into which the needles 68 of the needle assembly 42 can penetrate. Each side the needle assembly 42 includes a needle support arm 70, that can pivot in a vertical plane and move the needles 68 through the baling chamber 18 with the twine, not shown, to the knot tying device assembly 66 as soon as a bale 44 is to be bound. The cover 21 is carried at various points along its length by a yoke 72 at each point which forms a part of a repositioning arrangement 74 which also includes a base body 76.

The bottom 23 is also of conventional configuration of a steel sheet metal, profiled if necessary, that extends over the entire length of the baling chamber 18 and lies upon each of the base bodies 76 without moving. While the cover 21 is essentially closed, the bottom 23 is interrupted by the crop inlet 24 for the supply channel 26 and the opening for the entry of the needles 68. The cover 21 and the bottom 23 extend generally parallel to each other; nevertheless in the rear outlet region for the bale 44, adjustable flaps, not shown but well known in themselves, are provided that give the bale 44 a certain resistance to movement.

The piston mechanism 40 contains the baling piston 48 that can be slid by means of the driver 50 between two end positions as this is described in EP-A2-0 940 072. In the preferred embodiment, the baling piston 48 is composed of an upper part 78 and a lower part 80, that overlap in a telescoping manner. The upper part 78 is configured in the form of a box that is open downward and closed upward, which surrounds the lower part 80 or is inverted over it. On each of its sides, the upper part 78 is provided with rolls 82 that are supported in bearings on pins 84, free to rotate, and that maintain a spacing to the outer surface. The pins 84 are located at approximately half the height of the upper part 78, but may also be arranged further up or further down. On each side, several rolls 82 are provided at the same height. In the interior of the upper part 78 several journals 86 are provided that extend perpendicular to the surface of the lower part 80. In the preferred embodiment three such journals 86 are located in the transverse direction. On the side facing the crop to be baled, compression means, channels for the passage of the needles or the like may be provided but are not shown.

The lower part 80 is configured similar to the upper part 78 but as a completely closed box. As a deviation from this, the lower part 80 may also be open downward and/or on the left side as seen in FIG. 1. The outside dimensions of the lower part 80 are somewhat smaller than that of the upper part 78, so that the latter can overlap the former. On the side walls of the lower part 80, journals 88 are also provided with rolls 90 supported in bearings, free to rotate, on these in particular, several in a row at equal height. The rolls 82 and 84 may be aligned with each other in the vertical direction, but need not necessarily be so aligned. Chambers 92 are provided in the upper side of the lower part 80 that are aligned vertically with the journals 86 and engage these, free to slide. The journals 86 and the chambers 92 are not absolutely required, but contribute to the ability of the upper part 78 to be moved on the lower part 80 without jamming, and they assure a perfect positive lock between the upper and the lower parts 78 and 80, respectively, for an effective transmission of force between the driver 50 and the bale 44. The chambers 92 can be formed by tubes welded in place or the like. Otherwise, the front walls in the one direction, and in the other direction the rear walls of the upper and the lower part 78 and 80, are in contact with one another.

The steering arm 62 operates by means of two steering arms 94, that can be spread, upon the upper piston part 78 as well as upon the lower piston part 80.

The bearing location 58 for the connection in a joint of the first steering arm 56 can be repositioned in height as well as in the longitudinal direction of the baling chamber 18, for example, on an inclined plane, in such a way that the two steering arms 56 and 62 in their extended position extend in each case in the longitudinal center plane of the baling chamber 18. In an optimum manner, the bearing location 64 can also be repositioned on the baling piston 48, for example, by engaging bores at differing heights for the pin or by an electric motor. The connecting joint of the driver 50 need not be repositioned as long as the adjustment path can be changed. However, this is only one preferred configuration that can frequently be omitted. Depending on the configuration of the guides of the baling piston 48, the steering arms 56 and 62 can also engage off center of the baling chamber 18, that is, the connecting point of the steering arm 56 remains fixed. Otherwise this characteristic is independent of the selected method of repositioning of the cross section, but can be applied as an independent technical teaching.

Between the cover 21 and the bottom 23 a side wall 96 extends on each side and consists of an upper sheet metal part 98 and a lower sheet metal part 100. While the two upper sheet metal parts 98 are attached to the inside of the yoke 72, the two lower sheet metal parts 100 are retained by the base body 76. The upper sheet metal parts 98 as well as the lower sheet metal parts 100 extend upright but not in the same plane, but rather extend offset to the interior of the baling chamber 18 with an overlap in each of their positions. In the present embodiment, the lower sheet metal parts 100 are located outside of the upper sheet metal parts 98. In the region of movement of the lower journals 88, the upper sheet metal parts 98 may be provided with a recess, not shown.

The yoke 72 is configured in the form of an inverted "U" and is manufactured from tubing material or a weldment. In each vertical leg of the yoke 72, a guide receptacle configured as a U-shaped channel is defined which parallels to the longitudinal axis of the baling chamber 18, and which is dimensioned in such a way that it can receive longitudinal, channel shaped guides 102 formed in each of the opposite side parts 98 of the baling chamber for receiving the rolls 82 in themselves. Instead of being formed in the legs of the yoke 72, the guide receptacles could be in the form of separate tracks respectively fastened to the opposite legs of the yoke 72. In any event, the guide receptacles are provided only in those yokes 72 which are in the region of movement of the baling piston 48 and are integrally formed with, or rigidly connected to, such yokes. At the lower end of each leg of each yoke 72, an upper connection 104 is provided for a servo motor 106, that will be described in greater detail below. In place of the servo motors 106, other repositioning mechanisms can be used, for example, levers, threaded spindles, etc. At the inside of the yoke 72 between its legs, the cover 21 is rigidly attached, and at the legs, the upper sheet metal parts 98 are rigidly attached.

The base body 76 is configured as a "U" whose legs extend upward alongside the yoke 72. Between the legs of the base body 76, the bottom 23 rests on the base body 76 and is connected to it. Directly at the lower end of the leg on each side, a guide receptacle configured as a U-shaped channel is provided in, or which may alternatively be provided in, the form of a U-shaped rail attached on the legs, which extend parallel to the guide receptacles of the yoke 72. These guide receptacles receive correspondingly shaped U-shaped guides 108 of the lower baling chamber part 23, which guides 108 receive the rolls 90 of the lower baling piston part 80, free to rotate. Above the guides 108, the lower sheet metal parts 100 are rigidly attached to the inner sides of the legs of the base body 76. In the upper region of the legs, openings 112 are provided through which journals 114 extend, free to move, that connect the needle support arms 70 with the yoke 72. While the bottom of the base body 76 can be made of a tube, a rail, a weldment or the like, its legs are configured as vertical guides that contain an interior space 110.

At the bottom of each interior space 110, a further connection 104 is provided for the other end of the servo motor 106. In the region of the interior space 110 located above the servo motors 106, the legs of the yoke 72 are engaged, free to slide and to move vertically.

According to FIGS. 4 and 5, the cover 21 with the guides 102 and the upper sheet metal parts 98 as well as the bottom 23 with the guides 108 and the lower sheet metal parts 100, are each combined into a pan that may be formed, for example, as a one-piece sheet metal component provided with edges.

The servo motors 106 extend between the bottom of the interior space 110 and the lower end of the legs of the yoke 72 and are connected with these over each of the connections 104 in a positive lock. The servo motors 106 may be configured as hydraulic as well as electric motors which may, however, depend on the forces transmitted, the space available and the like. However, there must be a guarantee that during a repositioning process all servo motors 106 cover exactly the same path so that there is no warping between each of the yokes 72. The servo motors 106 are remotely controlled, for example, from the vehicle towing the baler 10. While in the present embodiment the servo motors 106 are assumed to be double acting hydraulic motors, in other embodiments single acting servo motors 106 could also be used, that are retracted downward either on the basis of spring force or the force of gravity acting on the yokes 72.

On the basis of the above description, the result is the following configuration and the following operation.

The chamber bottom 23, and the lower sheet metal parts 100 are inserted into and fastened to the base body 76 such that the ribs or channels are received in the correspondingly shaped channels 108 formed in the base body 76. Following this, the servo motors 106 are inserted into the interior spaces 110, connected to the base bodies 76 and connected to a hydraulic system, not shown. Following this the yokes 72 are inserted from above into the interior spaces 110 of the legs of the base bodies 76 and connected to the servo motors 106. Subsequently, the guides 102, the upper sheet metal parts 98 and the covers 21, are fastened to the inner side of the yokes 72. Alternatively the yokes 72 can also be connected with the upper sheet metal parts 98, the cover 21 and the guides 102, and then inserted into the base bodies 76. At this point in the assembly, the baling chamber 18 is complete. Finally, the baling piston 48 composed of the upper and the lower parts 78 and 80, respectively, is slid into the baling chamber 18 in such a way that its rolls 82 and 90 can respectively roll in the guides 102 and 108. As the last step, the two steering arms 94 are connected with the upper and lower piston parts 78 and 80 and with the steering arm 62.

According to FIGS. 2 and 4, the baling chamber 18 can be adjusted to occupy a maximum height position, and, according to FIGS. 3 and 5, it can be adjusted to occupy a minimum height position.

The further description begins with the assumption that that the baling chamber 18 is being adjusted from its maximum height condition to its minimum height condition. This is accomplished by performing the following steps.

First, the servo motors 106 are retracted synchronously to pull the yokes 72 downward, whereby the baling chamber 18 becomes lower. Over the guides 102 attached to the yokes 72, the upper part 78 of the baling piston 48 is also moved downward, whereupon the journals 86 slide into the chambers 92. Simultaneously the upper sheet metal parts 98 move along the lower sheet metal parts 100. Also simultaneously the bearing location 58 is moved so that the stroke of the baling piston 48 and the position of the steering arms 56, 62 remains unchanged relative to the baling piston 48.

On the basis of the attachment of the needle assembly 42 to the yoke 72 or the upper part of the housing 20, the former also moves upward or downward and maintains the spacial relationship to the knot tying device assembly 66.

While the present embodiment originated with the assumption that the upper part of the housing 20 is movable and the lower part of the housing 22 is fixed, this could also be the reverse, where then, however, the supply channel 26 and the components connected to it would have to be modified accordingly. Finally all side walls, the cover 21 and the bottom 23 could also be repositioned individually or in unison.

Having described the preferred embodiment, it will become apparent that various modifications can be made without departing from the scope of the invention as defined in the accompanying claims.

What is claimed is:

1. In a baler having a baling chamber, which is generally rectangular in cross section, for producing parallelepiped bales, a baling piston mounted for reciprocating within a defined longitudinal section of the baling chamber for compacting crop to form a bale, a driver coupled for effecting reciprocating movement of said baling piston and a needle assembly including arms mounted to said baling chamber for pivotal movement about a horizontal transverse axis between standby and tying positions, the improvement comprising: at least said longitudinal section of said baling chamber having separate upper and lower parts; said upper part defining a top wall of said longitudinal section of the baling chamber and including a first set of opposite side walls respectively located at opposite sides of, and extending down from, said top wall; said lower part defining a bottom wall of said longitudinal section of the baling chamber and including a second set of opposite side walls respectively located at opposite sides of, and extending up from, said bottom wall and respectively overlapping said first set of opposite side walls of said upper part; said top and bottom walls being arranged parallel to each other; said upper part being mounted for vertical movement relative to said lower part so as to maintain said top and bottom in parallel relationship to each other and for the purpose of changing the cross section of at least said longitudinal section of said baling chamber between maximum and minimum heights; and an actuator assembly being coupled between said upper and lower parts for effecting said relative movement between said upper and lower parts.

2. The baler, as defined in claim 1, wherein said arms of said needle assembly are connected to said upper part of said chamber for moving with it in response to actuation of said actuator assembly.

3. The baler, as defined in claim 1, wherein said driver is mounted for being moved in order to move the baling piston in the direction of repositioning of the upper part of the baling chamber.

4. The baler, as defined in claim 1, wherein said baling piston is configured as a multi-piece component including upper and lower components respectively coupled to said upper and lower parts of said chamber, whereby said upper component moves together with said chamber upper part.

5. The baler, as defined in claim 1, wherein said actuator assembly includes several servo motors each coupled between said upper and lower parts of said chamber; and a control arrangement for controlling said servo motors in unison.

6. The baler, as defined in claim 1, wherein said baling piston comprises upper and lower parts respectively including first and second portions mounted in a vertically overlapping, telescopic manner.

7. The baler, as defined in claim 6, wherein said baling chamber is surrounded at several locations by a repositioning arrangement, each of which includes an upper part defined by a yoke that can be repositioned vertically; said chamber upper part being constructed of sheet metal formed to include said first set of side walls; said first set of side walls being coupled to said yoke; said repositioning arrangement further including a base body; said chamber lower part being constructed of sheet metal formed to include said second set of side walls; said second set of side walls being fixed to said base body; said first and second sets of side walls each being provided with longitudinally extending, parallel guides; and upper and lower sets of rollers being respectively mounted to said upper and lower parts of said piston and received for longitudinal movement along said parallel guides.

8. The baler, as defined in claim 6, wherein said first and second portions of said upper and lower parts of said piston are constructed relative to each other such that said upper and lower parts of said piston are connected to each other in a positive lock in a direction of compression of the crop to be baled.

9. The baler, as defined in claim 6, wherein said driver is coupled to said baling piston by upper and lower steering arms having forward ends coupled to said driver and having respective rear ends coupled to said upper and lower parts of said baling piston.

10. The baler, as defined in claim 1, wherein at least one repositioning member is mounted in surrounding relationship to said baling chamber; said repositioning member including an upper part defined by a yoke coupled to said upper part of said chamber, and a separate lower part defined by a U-shaped base body coupled to said lower part of said chamber and having opposite legs extending upwardly along opposite sides of said baling chamber; said opposite legs of said base respectively being provided with a pair of clearance openings; a pair of coupling pins being respectively fixed to opposite sides of said yoke and projecting through said pair of clearance openings; said arms of said needle assembly being respectively mounted to said pair of pins; and said actuator assembly being coupled between said yoke and base member, whereby adjustment of said upper chamber part vertically relative to said lower chamber part will cause a corresponding vertical adjustment of said needle arms.

11. In a baler including a baling chamber structured for forming parallelepiped bales and including two sets of opposite walls defining a rectangular cross section; and a baling piston mounted for reciprocating within a defined longitudinal section of said baling chamber, the improvement comprising: said baling chamber being divided into separate first and second parts extending at least over said defined longitudinal section of said baling chamber, and which are each U-shaped in vertical cross section, with legs of said first part overlapping legs of said second part and cooperating therewith to define a first set of said two sets of opposite walls of said baling chamber; said first and second parts respectively defining first and second walls of a second set of said two sets of opposite walls; said first part being mounted for movement toward and away from said second part so as to respectively decrease and increase the amount of overlap of said legs to thereby decrease and increase the cross section of the baling chamber; and an actuator being coupled between said first and second parts for selectively moving said first part toward and away from said second part.

* * * * *